US012636231B2

(12) United States Patent
Heyman

(10) Patent No.: US 12,636,231 B2
(45) Date of Patent: May 26, 2026

(54) BABY BOTTLE ASSEMBLY

(71) Applicant: Boom Boom Baby LLC, Dallas, TX (US)

(72) Inventor: Lydia Heyman, Dallas, TX (US)

(73) Assignee: Boom Boom Baby LLC, Dallas, TX (US)

( * ) Notice: Subject to any disclaimer, the term of this patent is extended or adjusted under 35 U.S.C. 154(b) by 0 days.

(21) Appl. No.: 18/816,297

(22) Filed: Aug. 27, 2024

(65) Prior Publication Data

US 2025/0073130 A1 Mar. 6, 2025

Related U.S. Application Data

(60) Provisional application No. 63/535,786, filed on Aug. 31, 2023.

(51) Int. Cl.

*A61J 9/00* (2006.01)
*A61J 9/04* (2006.01)
*A61J 9/08* (2006.01)
*A61J 11/00* (2006.01)

(52) U.S. Cl.

CPC ................ *A61J 9/085* (2013.01); *A61J 9/04* (2013.01); *A61J 11/002* (2013.01); *A61J 11/0085* (2013.01)

(58) Field of Classification Search

CPC ...... A61J 9/085; A61J 9/04; A61J 9/00; A61J 11/002; A61J 11/0085; A61J 11/008; A61J 9/08; A61J 9/008; B65D 2543/00916

See application file for complete search history.

(56) References Cited

U.S. PATENT DOCUMENTS 1,429,585 A * 9/1922 Hagerty ................ A61J 11/008 215/11.6
1,649,580 A * 11/1927 Geisler ................ A61J 11/008 215/11.6
2,008,798 A * 7/1935 Rossiter ............ B65D 43/0222 220/282
2,138,061 A * 11/1938 Friedinger ......... B65D 43/0222 220/282
3,051,350 A * 8/1962 Burdick ............ B65D 43/0222 220/282
3,067,899 A * 12/1962 Everett ................ B65D 55/02 215/349
3,067,906 A * 12/1962 Burdick ............ B65D 43/0222 220/282

(Continued)

FOREIGN PATENT DOCUMENTS

GB 2494190 A * 3/2013 ............ B65D 23/10
JP 201516219 * 7/2014
KR 200223459 Y1 * 5/2001

*Primary Examiner* — Gideon R Weinerth
(74) *Attorney, Agent, or Firm* — Fish & Richardson P.C.

(57) ABSTRACT

The present disclosure relates to a baby bottle assembly including a bottle having an open end, a closed end opposite the open end, and an interior volume extending between the open and closed ends. A collar is configured to couple to the open end of the bottle. A cap includes a closed end and an open end, the open end being configured to couple to the collar and configured to couple to the closed end of the bottle. An arc-shaped gap is defined between the cap and the collar when the open end of the cap is coupled to the collar.

27 Claims, 4 Drawing Sheets

(56) References Cited

U.S. PATENT DOCUMENTS

| | | | | | |
|---|---|---|---|---|---|
| 3,130,857 | A * | 4/1964 | Burdick | B65D 43/0216 | 220/784 |
| 3,186,579 | A * | 6/1965 | Meyerhoefer | B65D 43/0216 | D9/454 |
| 3,327,890 | A * | 6/1967 | Burdick, Jr. | B65D 43/0222 | 220/282 |
| 3,333,728 | A * | 8/1967 | Burdick, Jr. | B65D 43/0212 | 220/792 |
| 3,741,431 | A * | 6/1973 | Burdick, Jr. | B65D 43/0222 | 220/282 |
| 4,600,111 | A | 7/1986 | Brown | | |
| 4,813,570 | A * | 3/1989 | Pontoppidan | B65D 43/0212 | 220/788 |
| 5,211,299 | A * | 5/1993 | Manfredonia | A61J 9/02 | 215/11.1 |
| 5,269,426 | A * | 12/1993 | Morano | A61J 11/008 | 220/784 |
| 7,287,657 | B1 * | 10/2007 | Rodriguez | A61J 11/008 | 215/11.1 |
| 8,113,364 | B1 | 2/2012 | Asadi | | |
| D674,103 | S * | 1/2013 | Smith | D24/197 | |
| D681,838 | S * | 5/2013 | Dalley | D24/197 | |
| 9,352,877 | B2 | 5/2016 | Furlong | | |
| D790,717 | S * | 6/2017 | Clores | D24/197 | |
| 10,182,972 | B2 | 1/2019 | Trawick et al. | | |
| 10,214,329 | B2 * | 2/2019 | Kalokhe | B65D 47/20 | |
| D874,013 | S * | 1/2020 | Wagenknecht | D24/197 | |
| 12,502,015 | B2 * | 12/2025 | Boomsma | A47G 19/2272 | |
| 2006/0006128 | A1 | 1/2006 | Resendiz Sanudo | | |
| 2006/0060553 | A1 | 3/2006 | Fleming | | |
| 2007/0012643 | A1 * | 1/2007 | McKiddy | A61J 11/008 | 215/11.1 |
| 2007/0012693 | A1 | 1/2007 | Kummer | | |
| 2009/0134112 | A1 | 5/2009 | Reeves | | |
| 2013/0341297 | A1 | 12/2013 | Stephan et al. | | |
| 2021/0228751 | A1 * | 7/2021 | Hakim | A61L 2/04 | |
| 2022/0313559 | A1 | 10/2022 | Bastien | | |
| 2025/0073130 | A1 * | 3/2025 | Heyman | A61J 11/002 | |
| 2025/0256896 | A1 * | 8/2025 | Salemi | B65D 43/0212 | |

* cited by examiner

BABY BOTTLE ASSEMBLY

CROSS-REFERENCE TO RELATED APPLICATION

The priority benefit of U.S. Provisional App. No. 63/535,786, filed Aug. 31, 2023, is hereby claimed, and the entire contents are incorporated herein by reference.

TECHNICAL FIELD

The present disclosure relates to a baby bottle assembly, and more particularly, to a baby bottle assembly with a cap that couples to opposing ends of a bottle.

BACKGROUND

A typical baby bottle includes a bottle, a nipple, and a collar that secures the nipple to the bottle. Some baby bottles also have covers or caps that snap onto the bottle or collar to keep the nipple covered and clean when the bottle is not in use. Baby bottle caps are often the first components of baby bottle assemblies that get misplaced and lost, as they are neither necessary for feeding a baby nor do they remain connected to the bottle or collar when the bottle is in use.

SUMMARY

The present disclosure is directed to a baby bottle assembly that allows for single-handed removal and storage of a cap of a bottle assembly.

In an example implementation, a baby bottle assembly includes a bottle including an open end, a closed end opposite the open end, and an interior volume that extends between the open and closed ends; a collar configured to couple to the open end of the bottle; and a cap having a closed end and an open end, the open end configured to couple to the collar and configured to couple to the closed end of the bottle, the cap configured to couple to the collar to form an arc-shaped gap between the cap and the collar.

In an aspect combinable with the example implementation, the cap includes a cavity.

In another aspect combinable with any of the previous aspects, the cap is configured to couple to the closed end of the bottle such that the bottle extends into the cavity of the cap at least 0.5 inches.

In another aspect combinable with any of the previous aspects, the cap has a cap height and when the cap is coupled to the closed end of the bottle, the bottle extends into the cap at a distance that is at least 10% of the cap height.

In another aspect combinable with any of the previous aspects, the distance is in a range of approximately 15% to approximately 90% of the cap height.

In another aspect combinable with any of the previous aspects, the open end of the cap has a convex portion and a concave portion.

In another aspect combinable with any of the previous aspects, the concave portion is at least partially defining the arc-shaped gap when the cap is coupled to the collar.

Another aspect combinable with any of the previous aspects includes a nipple coupled to the open end of the bottle.

In another aspect combinable with any of the previous aspects, when the cap is coupled to the bottle, the nipple is sealed.

Another aspect combinable with any of the previous aspects includes a flow control member disposed between the nipple and the interior volume of the bottle.

In another aspect combinable with any of the previous aspects, the flow control member includes a first valve and a second valve.

In another aspect combinable with any of the previous aspects, the first valve is centrally aligned with the nipple, and the second valve is radially offset relative to the first valve.

In another aspect combinable with any of the previous aspects, the second valve is configured to open to permit air flow between the interior volume of the bottle and a cavity of the nipple based on a vacuum force.

In another aspect combinable with any of the previous aspects, the flow control member includes a radial flange configured for placement between a neck of the bottle and a flange of the nipple.

In another aspect combinable with any of the previous aspects, the radial flange includes one or more grooves adjacent to the second valve.

In another aspect combinable with any of the previous aspects, the cap includes a recessed central area that is configured to engage the nipple when the cap is coupled to the collar.

In another aspect combinable with any of the previous aspects, an exterior surface of the closed end of the cap is textured.

In another aspect combinable with any of the previous aspects, the cap includes an indentation adjacent to the closed end.

In another aspect combinable with any of the previous aspects, the indentation includes a textured surface.

In another example implementation, a baby bottle assembly includes a bottle including an open end, a closed end opposite the open end, and an interior volume extending between the open and closed ends; a collar configured to couple to the open end of the bottle; and a cap having a closed end and an open end. The open end is configured to couple to the collar and configured to couple to the closed end of the bottle. The cap includes an indentation adjacent to the closed end.

In an aspect combinable with the example implementation, an arc-shaped gap is defined between the cap and the collar when the open end of the cap is coupled to the collar.

In another aspect combinable with any of the previous aspects, the cap includes a cavity.

In another aspect combinable with any of the previous aspects, when the cap is coupled to the closed end of the bottle, the bottle extends into the cavity of the cap at least 0.5 inches.

In another aspect combinable with any of the previous aspects, the cap has a cap height and when the cap is coupled to the closed end of the bottle.

In another aspect combinable with any of the previous aspects, the bottle extends into the cap at a distance that is at least 10% of the cap height.

In another aspect combinable with any of the previous aspects, the distance is in a range of approximately 15% to approximately 40% of the cap height.

In another aspect combinable with any of the previous aspects, the open end of the cap has a convex portion and a concave portion.

In another aspect combinable with any of the previous aspects, the concave portion at least partially defines the arc-shaped gap when the cap is coupled to the collar.

Another aspect combinable with any of the previous aspects includes a nipple coupled to the open end of the bottle.

In another aspect combinable with any of the previous aspects, when the cap is coupled to the collar, the nipple is sealed.

In another aspect combinable with any of the previous aspects, the cap includes a recessed central area that is configured to engage the nipple when the cap is coupled to the collar.

Another aspect combinable with any of the previous aspects includes a flow control member configured for placement between the nipple and the interior volume of the bottle.

In another aspect combinable with any of the previous aspects, the flow control member includes a first valve and a second valve.

In another aspect combinable with any of the previous aspects, the first valve is centrally aligned with the nipple.

In another aspect combinable with any of the previous aspects, wherein the second valve is radially offset relative to the first valve.

In another aspect combinable with any of the previous aspects, the second valve is configured to open to permit air flow when a vacuum force is created.

In another aspect combinable with any of the previous aspects, the flow control member includes a flange configured for placement between a neck of the bottle and a flange of the nipple.

In another aspect combinable with any of the previous aspects, the flange includes one or more grooves adjacent to the second valve.

In another aspect combinable with any of the previous aspects, an exterior surface of the closed end of the cap has a textured surface.

In another aspect combinable with any of the previous aspects, the indentation includes a textured surface Systems and methods described in the present disclosure can include one or more of the following advantages.

The baby bottle assembly of the present disclosure may assist a caregiver in feeding a child while juggling a bottle and child with both hands. The baby bottle assembly is configured to advantageously store a cap of the bottle while the bottle is in use. Specifically, the cap is shaped and sized to stably couple to the bottom of the bottle so that the cap remains attached to the bottle when in use.

In some examples, the closed end of the bottle extends into 10-30% of the height of the cap, thereby lowering the center of gravity of the bottle and increasing the stability of the bottle when the cap is coupled to the closed end.

In some examples, the baby bottle assembly is easily disassembled single-handedly. For example, a user can remove the cap with one hand by pressing a thumb or other finger onto an indentation of the cap and rocking the cap off. A curved gap disposed between the cap and the collar allows for a user to intentionally rock the cap relative to the bottle to decouple the cap from the collar.

In some examples, the cap includes two, opposing indentations that permit a user to grip the cap easily and decouple the cap from the collar.

In some examples, the baby bottle assembly includes a flow member with first and second valves that facilitate fluid flow when a child is sucking on the nipple, and prevents a negative pressure within the bottle. The flow member can also prevent leaking through the nipple if the bottle is turned upside-down.

In some examples, the baby bottle provides textured surfaces on both the closed end of the bottle and the closed end of the cap to provide stability for any configuration of the bottle assembly.

As used herein, the terms "top," "bottom," "upper," "lower," "above," and "below" are used to provide a relative relationship between structures. The use of these terms does not indicate or require that a particular structure must be located at a particular location in the apparatus.

Some examples may be described using the expression "coupled" and "connected" along with their derivatives. For example, some arrangements may be described using the term "coupled" to indicate that two or more elements are in direct physical or electrical contact. The term "coupled," however, may also mean that two or more elements are not in direct contact with each other, but yet still co-operate or interact with each other. The examples described herein are not limited in this context.

Other features and advantages of the present disclosure will be apparent from the following detailed description, figures, and claims.

DETAILED DESCRIPTION

Figure 2:
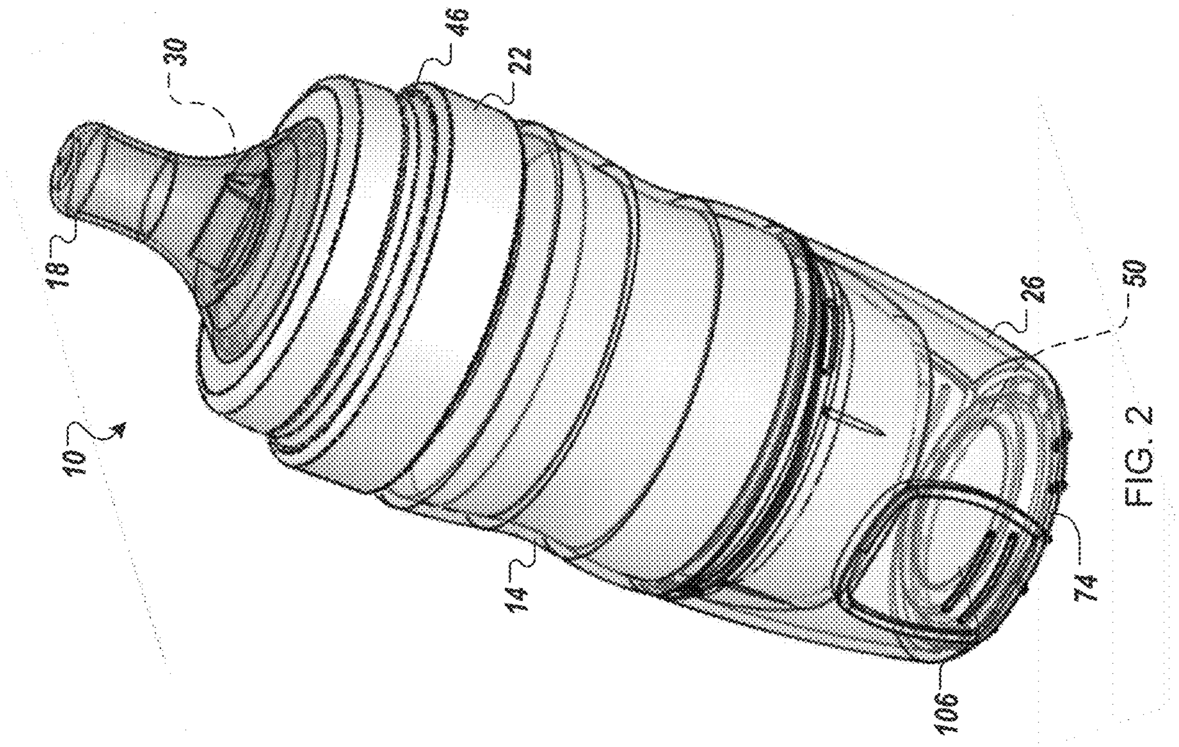
FIG. 2 is a perspective view of the baby bottle assembly of FIG. 1, showing the bottle assembly in an uncovered configuration.
Figure 1:
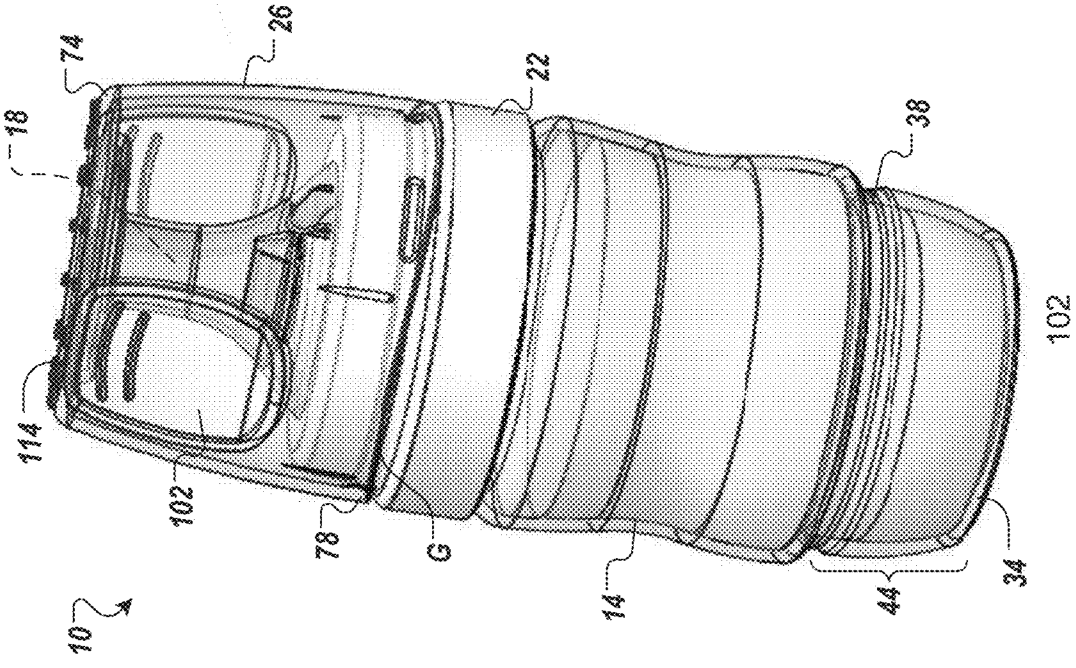
FIG. 1 is a perspective view of a baby bottle assembly in accordance with the teachings of the present disclosure, showing the bottle assembly in a covered configuration.

The present disclosure is directed to a baby bottle assembly that allows a user to remove a cap that covers the nipple and attach the cap to the bottle with one hand. In FIGS. 1-4, a bottle assembly 10 of the present disclosure includes a bottle 14, a nipple 18, a collar 22, and a cap 26. Each of the bottle 14, nipple 18, collar 22, and cap 26 can be disassembled for individual cleaning, and reassembled easily for use. The bottle assembly 10 also includes a flow control member 30 disposed between the bottle 14 and the nipple 18. In FIG. 1, the bottle assembly 10 is shown in a storage configuration where the cap 26 covers the nipple 18 and is coupled to the collar 22 to keep the bottle 14 from leaking and/or exposing the nipple 18 to the environment. In FIG. 2, the bottle assembly 10 is shown in a use configuration where the cap 26 is coupled to a closed end 34 of the bottle 14, thereby exposing the nipple 18.

Figure 4:
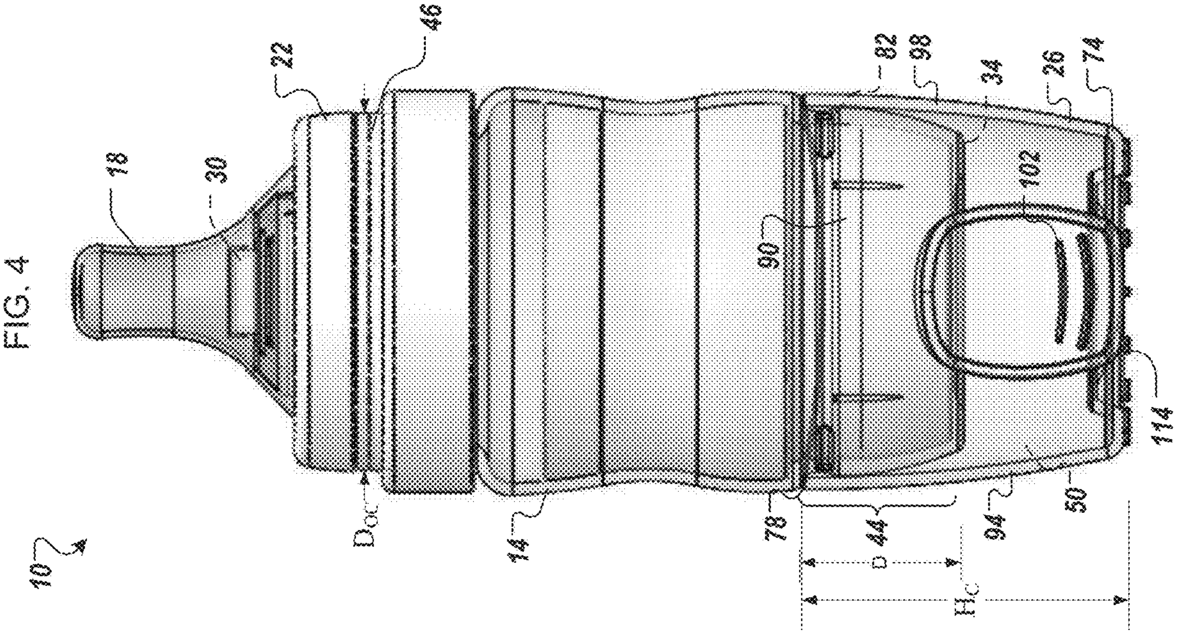
FIG. 4 is a front view of the baby bottle assembly of FIG. 2.
Figure 3:
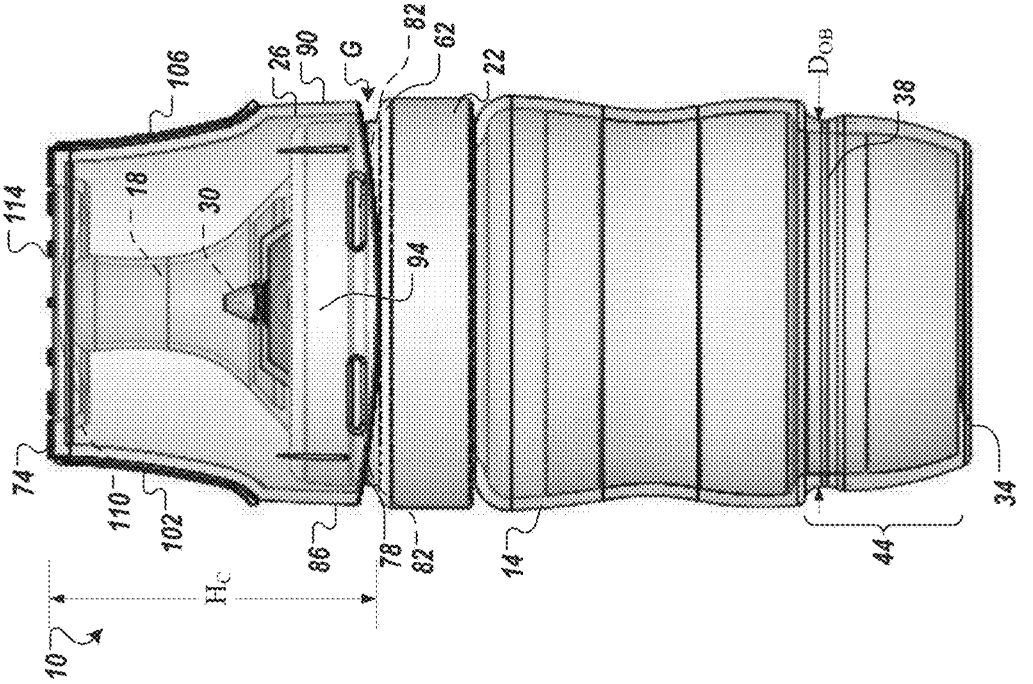
FIG. 3 is a front view of the baby bottle assembly of FIG. 1.

The bottle 14 includes an open end 36 (FIGS. 5 and 6), the closed end 34 opposite the open end 36, and an interior volume 42 extending between the open and closed ends 36, 34. As shown in FIGS. 1 and 3, a base 44 of the bottle 14 is defined between the closed end 34 and an annular groove 38. As shown in FIGS. 2 and 4, the base 44 is configured to extend into the cap 26 when the cap 26 is coupled to the closed end 34 of the bottle 14, and more specifically, when the cap 26 is coupled to the groove 38. The groove 38 in the bottle 14 is an annular groove that extends around a circumference of the bottle 14, and has an outer diameter $D_{OB}$ (FIG. 3) that is similar to or approximately equal to an outer diameter $D_{OC}$ of a groove 46 formed in the collar 22 (FIGS. 2 and 4).

In FIGS. 3 and 4, the bottle assembly 10 is shown in both the storage and use configurations, respectively. In the storage configuration, the cap 26 is secured to the collar 22 and engages with an opening in the nipple 18 to seal the nipple 18 from leakages, as will be described in more detail below. In the use configuration, the cap 26 is removed from the collar, and the base 44 of the bottle 14 extends into a cavity 50 of the cap 26 at a distance D. The distance D is at least 10% a cap height $H_C$, and in some examples, the distance D is in a range of approximately 10% of the cap height $H_C$ or more (e.g., about 15% or more, about 20% or more, about 25% or more, about 30% or more, about 35% or more, about 40% or more, about 45% or more, or about 50% or more) to approximately 95% of the cap height $H_C$ or less (e.g., about 90% or less, about 85% or less, about 80% or less, about 75% or less, about 70% or less, about 65% or less, or about 60% or less, about 55% or less). The bottle 14 may come in various sizes, for example, 4 oz and 8 oz. In both examples, the base 44 of the bottle 14 extends into the cavity 50 of the cap 26 at least 0.5 inches. In some examples, the base 44 of the bottle 14 extends into the cap 26 in a range of approximately 0.5 inches or more (e.g., about 0.75 inches or more or about 1 inch or more) to approximately 1.75 inches or less (e.g., about 1.50 inches or less or about 1.25 inches or less).

Figure 6:
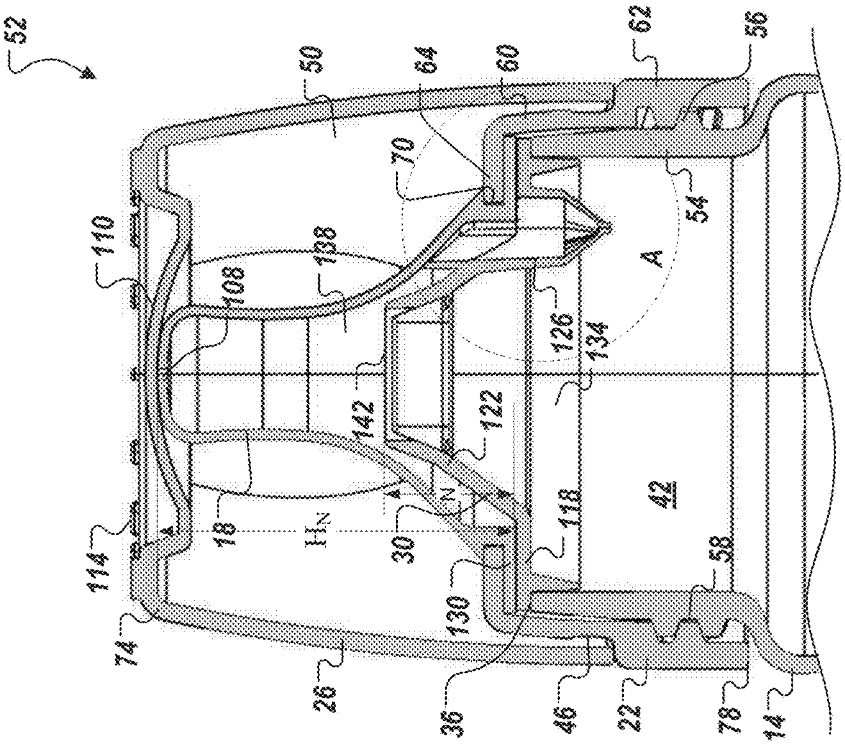
FIG. 6 is a front cross-sectional view of a nipple and cap subassembly of the baby bottle assembly of FIG. 5.
Figure 5:
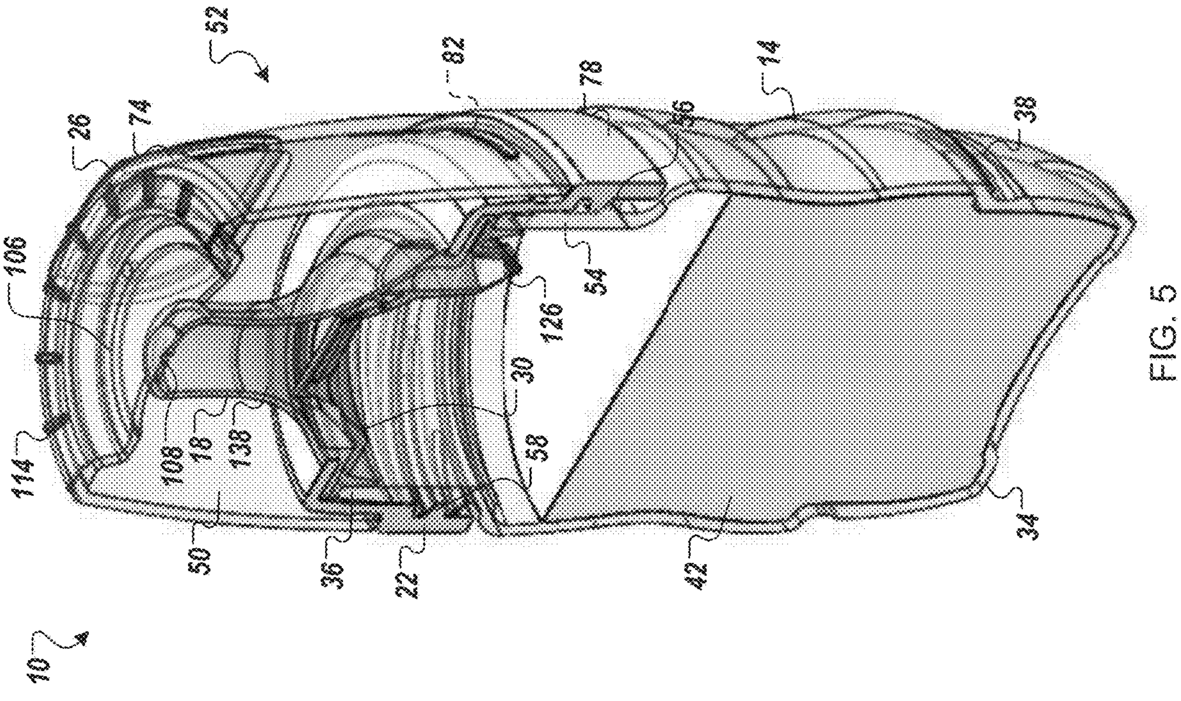
FIG. 5 is a perspective, cross-sectional view of the baby bottle assembly of FIG. 1.

Referring to FIGS. 5 and 6, a cap and nipple subassembly 52 includes the cap 26, nipple 18, flow control member 30, and a top portion of the bottle 14. Specifically, the bottle 14 includes a neck 54 adjacent to the open end 36 and that couples to the collar 22 to clamp the nipple 18 and flow control member 30 between the collar 22 and the bottle 14 when assembled. The neck 54 includes external threads 56 that are configured to rotatably couple to corresponding internal threads 58 of the collar 22. To assemble the cap and nipple subassembly 52, the flow control member 30 engages the open end 36 of the bottle 14, the nipple 18 covers the flow control member 30, and the collar 22 rotatably couples to the neck 54 to clamp the nipple 18 and flow control member 30 against the open end 36 of the bottle 14. Finally, the cap 26 couples to the collar 22 and engages the nipple 18 to create a fluid tight seal with the nipple 18.

In FIG. 6, the collar 22 includes a first portion 60 that secures the nipple 18 and flow control member 30 to the open end 36 of the bottle 14, and a second portion 62 that engages the neck 54 of the bottle 14. The first portion 60 includes a radial flange 64 that extends both generally perpendicularly and radially inwardly relative to the second portion 62, and the groove 46 that releasably receives a coupling mechanism 82 of the cap 26. The groove 46 is formed in the first portion 60 adjacent to where the first portion 60 transitionally steps outwardly into the second portion 62. A thickness of the collar 22 at the groove 46 is less than a thickness of both the first and second portions 60, 62. The flange 64 of the collar 22 is shaped for positioning within an exterior annular groove 70 formed in a bottom portion (i.e., flange 130) of the nipple 18. The second portion 62 of the collar 22 includes internal threads 58 that are arranged for coupling to the external threads 56 of the bottle 14.

Returning to FIGS. 1-4, the cap 26 has a closed end 74 and an open end 78 that is configured to couple to both the collar 22 and to the closed end 34 of the bottle 14. Specifically, the open end 78 of the cap 26 includes an interior coupling mechanism 82 that is configured to snap-fit to both the groove 46 of the collar 22 and the groove 38 of the bottle 14.

The cap 26 can be divided into four quadrants or sides 86, 90, 94, 98. First and second opposite sides 86, 90 of the cap 26 include the first and second indentations 102, 106, respectively. Each indentation 102, 106 is shaped to receive a person's thumb and includes a textured surface to permit a person to grip one side of the cap 26 and push the cap 26 off to remove the cap 26 from the collar 22 or the bottle 14. The textured surface may include ridges, dimples, or other coating to enhance grip. About 90 degrees separated from the first and second sides 86, 90 are third and fourth opposite sides 94, 98 of the cap 26.

The coupling mechanism 82 includes a pair of protrusions, shaped as horizontally-oriented ovals, disposed on an interior side of each of the third and fourth sides 94, 98 of the cap 26. The pair of protrusions 82 are configured to couple the cap 26 to the bottle 14, and specifically, to snap-fit into the groove 38 of the bottle 14. The pair of protrusions are also configured to couple the cap 26 to the collar 22, and specifically, to snap-fit into the groove 46 of the collar 22.

As shown in FIGS. 1 and 3, the open end 78 of the cap 26 has a convex portion and a concave portion that at least partially defines an arc-shaped gap G with the collar 22. Specifically, the first and second sides 86, 90 of the cap 26 define the concave edges of the open end 78 of the cap 26, and the third and fourth sides 94, 98 define the convex edges of the open end 78 of the cap 26. In FIG. 3, at the greatest point of curvature of the convex edges of the third and fourth sides 94, 98, the cap 26 sits generally flush against the second portion 62 of the collar 22. And at the greatest point of curvature of the concave edges of the first and second sides 86, 90, the open end 78 of the cap 26 defines an arc-shaped gap G with the collar 22. The arc-shaped gaps G at each of the first and second sides 86, 90 align with the indentations 102, 106 of the cap 26 to permit a user to push the cap 26 out of the groove 46 of the collar 22 and pop the cap 26 off of the collar 22.

In FIGS. 5 and 6, when the cap 26 is coupled to the collar 22 and covers the nipple 18, an opening 108 in the nipple 18 is sealed against an interior surface of the closed end 74 of the cap 26. Specifically, the cap 26 includes a recessed central portion 110 that is configured to engage the nipple 18 when the cap 26 is securely coupled to the collar 22. As shown in FIG. 6, the recessed central portion 110 is dome-shaped to seal and provide pressure to, but without significantly deforming, the nipple 18. In this configuration, the interior surface of the central portion 110 sealingly engages the opening 108 of the nipple, thereby sealing the bottle from leaking.

The cap 26 also includes radial ridges 114 disposed on an exterior surface of the closed end 74 of the cap 26. The radial ridges provide the cap 26 with a textured surface to enhance stability when the bottle assembly 10 is in the use configuration, as shown in FIGS. 2 and 4, and is placed on a flat surface.

Figure 7:
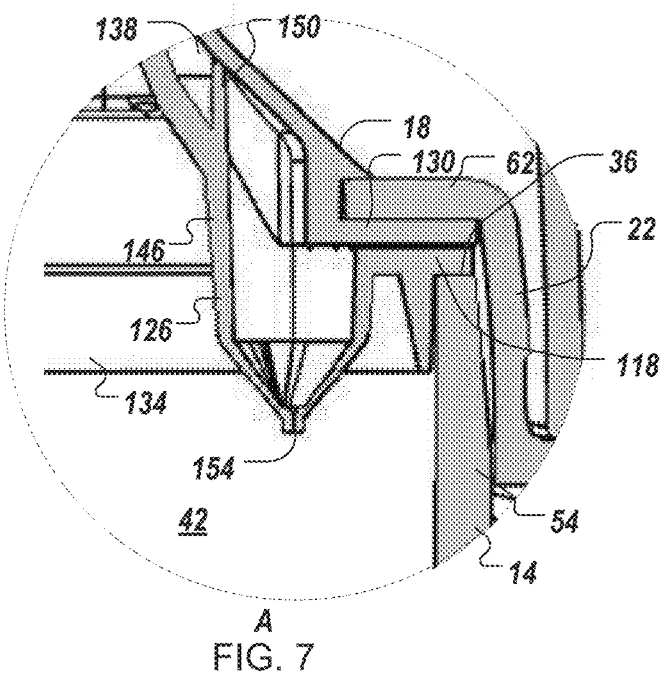
FIG. 7 is a magnified view of section A of FIG. 6.
Figure 8:
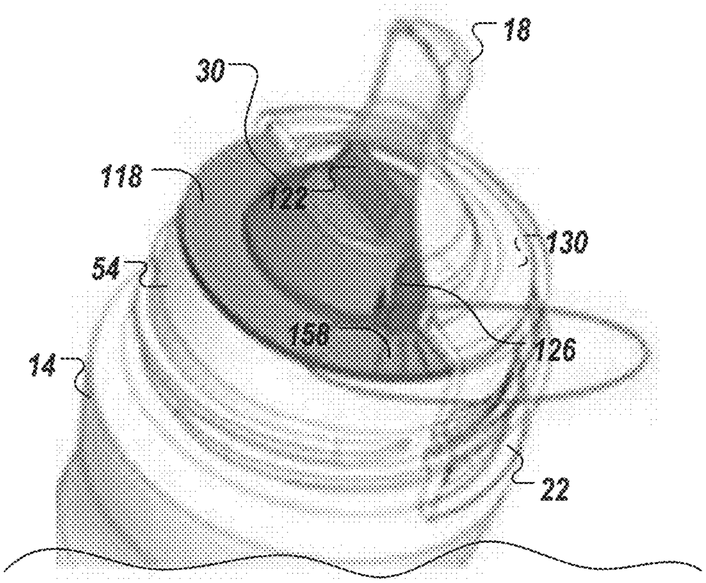
FIG. 8 is a partial, cut-away perspective view of the baby bottle assembly of FIG. 2.

Turning now to FIGS. 6-8, the flow control member 30 that may contribute to an anti-colic feature of the bottle assembly 10 will be described in more detail. In FIG. 6, the flow control member 30 is disposed between the nipple 18 and the interior volume 42 of the bottle 14, and is clamped to the bottle 14 by the nipple 18 and the collar 22. The flow control member 30 includes a radial flange 118, a first valve 122 and a second valve 126. When assembled to the bottle 14, the flange 118 of the flow control member 30 is disposed between the neck 54 of the bottle 14 and a flange 130 of the nipple 18. A first side of the flange 118 engages with the open end 36 of the bottle and 14 a second, opposite side of the flange 118 engages with the flange 130 of the nipple 18. The flow control member 30 has a ring 134 extending downwardly and outwardly relative to the flange 118 and seals against an interior surface of the open end 36 of the bottle 14.

The first valve 122 is centrally aligned with the nipple 18, and the second valve 126 is radially offset relative to the first valve 122. The first valve 122 has a peaked configuration that extends inwardly, at an angle, relative to the radial flange 118. When assembled with the nipple 18, the first valve 122 extends into a cavity 138 of the nipple 18 a distance N (FIG. 6) relative to a nipple height $H_N$. The distance N, which is measured from the base of the nipple 18 to an outlet 142 of the first valve 122, can be, e.g., at least 20% of the nipple height $H_N$. The outlet 142 of the valve 122 remains sealed until a suction force is applied to the nipple 18. In some examples, the distance N is in a range of approximately 20% of the nipple height $H_N$ or more (e.g., about 25% or more, about 30% or more, about 35% or more, about 40% or more, about 45% or more, or about 50% or more) to approximately 75% of the nipple height $H_N$ or less (e.g., about 70% or less, about 65% or less, or about 60% or less, about 55% or less).

As shown in FIGS. 6 and 7, the second valve 126 has a first portion 146 that extends into the volume 42 of the bottle 14 and a second portion 150 that extends into the cavity 138 of the nipple 18. The second portion 150 contacts a sloped, interior surface of the nipple 18. The second valve 126 extends downwardly, into the volume 42 of the bottle 14 (when assembled to the bottle 14), and defines a sealed inlet 154. As shown in FIG. 8, a top surface of the radial flange 118 of the flow control member 30 includes one or more grooves 158.

In some aspects, the second valve 126 is configured to open to permit air flow into the volume 42 of the bottle 14 when a vacuum force is created (i.e., when a suction force is applied to the nipple 18 and to the first valve 122). For example, air flow can be introduced into the volume 42, such as over or through grooves (or air channels) 158 formed on a top surface of the flange 118, upon a negative inner pressure (i.e., vacuum) is created in the volume 42. The second valve 126 will then open, allowing the air flow into the volume 42. Constant fluid flow will be controlled to avoid a back pressure build up in the volume 42.

The cap 26 and collar 22 may be made of a durable plastic, such as polyethylene (or other appropriate materials for the assembly 10), that may be formed by injection molding, thermoforming, or compression molding. The nipple 18 may be made of rubber or silicone. The bottle 14 may be made of glass or BPA-free plastic.

In some implementations, the groove 38 of the bottle 14 that defines the base 44 may not extend entirely around the circumference of the bottle 14.

In some examples, the cap 26 may be coupled to one or more indentations, dimples, or grooves that enable a snap-fit connection between the bottle and the cap. In such an example, the cap 26 has one or more interior protrusions 82 that are configured for coupling with both the collar 22 and the base 44 of the bottle 14.

In some implementations, the cap 26 includes fewer or more protrusions 82 that couple to the grooves 38, 46 of the bottle 14 and the collar 22. In one example, the cap 26 includes two opposing protrusions. In some examples, a groove may be formed on an interior side of the cap 26 and the protrusions 82 may be formed on the collar 22 and bottle 14 to couple to the groove of the cap 26. Other coupling mechanisms are also possible.

While this specification contains many specific implementation details, these should not be construed as limitations on the scope of any disclosure or of what may be claimed, but rather as descriptions of features that may be specific to particular examples of particular disclosures. Certain features that are described in this specification in the context of separate examples can also be implemented in combination in a single example. Conversely, various features that are described in the context of a single example can also be implemented in multiple examples separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the examples described herein should not be understood as requiring such separation in all examples, and it should be understood that the described program components and systems can generally be integrated together in a single product or packaged into multiple products.

Particular examples of the subject matter have been described. Other examples are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A baby bottle assembly, comprising:

a bottle comprising an open end, a closed end opposite the open end, and an interior volume that extends between the open and closed ends;

a collar configured to couple to the open end of the bottle; and a cap having a closed end and an open end, the open end configured to couple to the collar and configured to couple to the closed end of the bottle, the cap configured to couple to the collar to form an arc-shaped gap between the cap and the collar.

2. The assembly of claim 1, wherein the cap comprises a cavity, the cap configured to couple to the closed end of the bottle such that the bottle extends into the cavity of the cap at least 0.5 inches.

3. The assembly of claim 1, wherein the cap has a cap height and when the cap is coupled to the closed end of the bottle, the bottle extends into the cap at a distance that is at least 10% of the cap height.

4. The assembly of claim 3, wherein the distance is in a range of approximately 15% to approximately 90% of the cap height.

5. The assembly of claim 1, wherein the open end of the cap has a convex portion and a concave portion, the concave portion at least partially defining the arc-shaped gap when the cap is coupled to the collar.

6. The assembly of claim 1, comprising a nipple coupled to the open end of the bottle, and wherein when the cap is coupled to the bottle, the nipple is sealed.

7. The assembly of claim 6, comprising a flow control member disposed between the nipple and the interior volume of the bottle, the flow control member comprising a first valve and a second valve.

8. The assembly of claim 7, wherein the first valve is centrally aligned with the nipple, and the second valve is radially offset relative to the first valve.

9. The assembly of claim 7, wherein the second valve is configured to open to permit air flow between the interior volume of the bottle and a cavity of the nipple based on a vacuum force.

10. The assembly of claim 7, wherein the flow control member comprises a radial flange configured for placement between a neck of the bottle and a flange of the nipple, the radial flange comprising one or more grooves adjacent to the second valve.

11. The assembly of claim 6, wherein the cap comprises a recessed central area that is configured to engage the nipple when the cap is coupled to the collar.

12. The assembly of claim 1, wherein an exterior surface of the closed end of the cap is textured.

13. The assembly of claim 1, wherein the cap comprises an indentation adjacent to the closed end.

14. The assembly of claim 13, wherein the indentation comprises a textured surface.

15. A baby bottle assembly, comprising:

a bottle comprising an open end, a closed end opposite the open end, and an interior volume extending between the open and closed ends;

a collar configured to couple to the open end of the bottle; and a cap having a closed end and an open end, the open end being configured to couple to the collar and configured to couple to the closed end of the bottle, the cap comprising an indentation adjacent to the closed end, wherein an arc-shaped gap is defined between the cap and the collar when the open end of the cap is coupled to the collar.

16. The assembly of claim 15, wherein the cap comprises a cavity, and wherein when the cap is coupled to the closed end of the bottle, the bottle extends into the cavity of the cap at least 0.5 inches.

17. The assembly of claim 15, wherein the cap has a cap height and when the cap is coupled to the closed end of the bottle, the bottle extends into the cap at a distance that is at least 10% of the cap height.

18. The assembly of claim 17, wherein the distance is in a range of approximately 15% to approximately 40% of the cap height.

19. The assembly of claim 15, wherein the open end of the cap has a convex portion and a concave portion, the concave portion at least partially defining the arc-shaped gap when the cap is coupled to the collar.

20. The assembly of claim 15, comprising a nipple coupled to the open end of the bottle, and wherein when the cap is coupled to the collar, the nipple is sealed.

21. The assembly of claim 20, wherein the cap comprises a recessed central area that is configured to engage the nipple when the cap is coupled to the collar.

22. The assembly of claim 20, comprising a flow control member configured for placement between the nipple and the interior volume of the bottle, the flow control member comprising a first valve and a second valve.

23. The assembly of claim 22, wherein the first valve is centrally aligned with the nipple, and wherein the second valve is radially offset relative to the first valve.

24. The assembly of claim 22, wherein the second valve is configured to open to permit air flow when a vacuum force is created.

25. The assembly of claim 22, wherein the flow control member comprises a flange configured for placement between a neck of the bottle and a flange of the nipple, the flange comprising one or more grooves adjacent to the second valve.

26. The assembly of claim 15, wherein an exterior surface of the closed end of the cap has a textured surface.

27. The assembly of claim 15, wherein the indentation comprises a textured surface.

* * * * *